United States Patent
Hollis

(10) Patent No.: US 11,418,370 B2
(45) Date of Patent: Aug. 16, 2022

(54) TIME-VARIABLE DECISION FEEDBACK EQUALIZATION

(71) Applicant: Micron Technology, Inc., Boise, ID (US)

(72) Inventor: Timothy M. Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/149,364

(22) Filed: Jan. 14, 2021

(65) Prior Publication Data

US 2022/0224570 A1  Jul. 14, 2022

(51) Int. Cl.
*H04L 25/03* (2006.01)

(52) U.S. Cl.
CPC .............................. *H04L 25/03057* (2013.01)

(58) Field of Classification Search
CPC ........ H04L 25/03057; H04L 25/03025; H03K 2005/00019; H03K 5/135
See application file for complete search history.

(56) References Cited

U.S. PATENT DOCUMENTS

| | | | | |
|---|---|---|---|---|
| 9,542,911 | B2* | 1/2017 | Tsukagoshi | .......... H04N 9/3155 |
| 9,542,991 | B1 | 1/2017 | Xie et al. | |
| 2014/0056345 | A1* | 2/2014 | Dickson | ............ H04L 25/03057 375/233 |
| 2020/0250124 | A1* | 8/2020 | Muljono | .................. G11C 7/22 |
| 2020/0304351 | A1* | 9/2020 | Eimitsu | ............. H04L 25/03057 |

* cited by examiner

*Primary Examiner* — Janice N Tieu
(74) *Attorney, Agent, or Firm* — Holland & Hart LLP

(57) ABSTRACT

Methods, systems, and devices for techniques for time-variable decision feedback equalization are described. A memory device may be coupled with a host device using one or more conductive lines. A receiver may receive a signal transmitted from another device over a conductive line. The receiver may include a decision circuit used to determine voltages of the received signal based on the received signal and a feedback signal and output an output signal. The receiver may include a variable time-delay circuit configured to output delayed signals that are delayed versions of the output signal and a gain circuit that is configured to scale the delayed signals to generate the feedback signal. The variable time-delay circuit may include delay elements having variable delay parameters. The receiver may be coupled with a memory array that stores the information conveyed by the output signal.

22 Claims, 7 Drawing Sheets

TIME-VARIABLE DECISION FEEDBACK EQUALIZATION

FIELD OF TECHNOLOGY

The following relates generally to one or more systems for memory and more specifically to time-variable decision feedback equalization.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
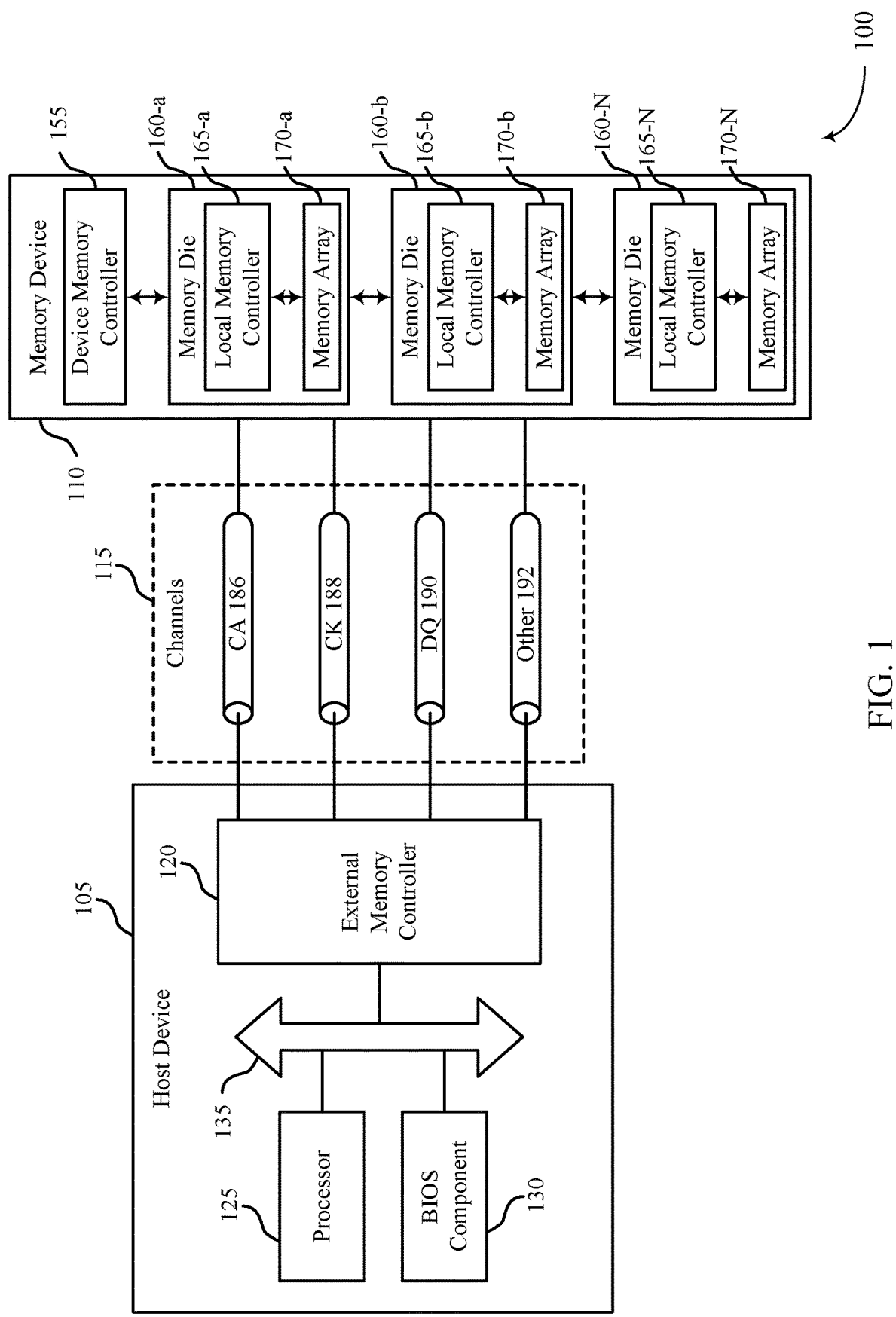
FIG. 1 illustrates an example of a system that supports time-variable decision feedback equalization in accordance with examples as disclosed herein.

A signal transmitted between devices (e.g., a host device and memory device) over a conductive line may be degraded by the time the transmitted signal reaches the receiving device. In some examples, reflections of a transmitted signal occur on the conductive line and interfere with subsequent portions of the signal (or with subsequent signals transmitted over the conductive line). To compensate for the interference, a receiving device may use equalization to cancel reflections (or other interference) caused by a previous signal before processing a received signal. In some examples, a receiving device includes a decision feedback equalization (DFE) circuit that is configured to reduce interference in the received signal.

The DFE circuit may include a decision circuit that samples a received signal. In some examples, the decision circuit may sample the received signal on a unit interval basis. The decision circuit may further output a digitized signal based on the received signal. The DFE circuit may also include a feedback circuit that feeds back time-delayed and scaled versions of the signal (either the digitized signal or the analog signal) to subsequent portions of the received signal to cancel out reflections caused by the received signal. The feedback circuit may include a time-delay circuit and a variable gain circuit. In some examples, the time-delay circuit may apply fixed time-delays (e.g., full and/or fractional time delays) to a signal output by the decision circuit, and the variable gain circuit may scale the time-delayed signals to generate the feedback signal. The DFE circuit may subtract the feedback signal from the received signal to obtain a modified signal that more closely represents the originally transmitted signal before the modified signal is processed by the decision circuit.

A performance of the DFE circuit, however, may be limited based on the type, quantity, and/or fixed time-delay of delay elements included in a delay circuit. That is, in some examples, a DFE circuit solely includes delay elements that introduce delays that are integer multiples of the unit interval. In such cases, if the reflections of the information signal are delayed by a non-integer multiple of the unit interval, the feedback signal may not be aligned with the reflections of the information signal, reducing a cancellation performance of the feedback signal. In some examples, to better align the feedback signal with the reflections and improve the equalization performance, the DFE circuit may also include fractional delay elements that introduce delays that are non-integer multiples of the unit interval. However, increasing the quantity of delay elements in the DFE circuit to also include fractional delay elements may increase a complexity, footprint, and/or power consumption of the DFE circuit.

Additionally, or alternatively, the DFE circuit may include a limited quantity of delay elements (e.g., less than 3 delay elements)—e.g., to save power, reduce complexity, reduce footprint, etc. In such cases, the limited quantity of delay elements may generate a set of fixed time-delayed signals that fail to overlap with more significant reflections that occur with non-overlapping delays. Thus, significant reflections may be passed to an input of a decision circuit without any compensation. For example, if the DFE circuit includes a first delay element that applies a unit interval of delay and a second delay element that applies three unit intervals of delay, reflections having two unit intervals of delay may not be reduced by the DFE circuit. In some examples, to avoid missing reflections, a DFE circuit may be configured with a large quantity of delay elements (e.g., full and fractional delay elements), and a set of delay elements that reduces the reflections by a threshold amount may be activated. In some cases, including and supporting a large quantity of delay elements may increase a complexity and footprint of the DFE circuit.

To improve a performance of a DFE circuit while using a reduced quantity of delay elements, a DFE circuit may be configured to include one or more variable time-delay elements. The DFE circuit may include a decision circuit that determines a voltage level of a received information signal and generates an output information signal; a delay circuit that includes one or more delay elements and generates one or more delayed signals based on the output information signal; and a variable gain circuit that includes one or more variable gain amplifiers and generates a feedback signal based on the one or more delayed signals. In some examples, delay parameters of the one or more delay elements may be programmable or adjustable so that the delayed signals align in time with significant reflections of the received information signal.

Features of the disclosure are initially described in the context of a system. Features of the disclosure are also described in the context of circuits and a signal diagram. These and other features of the disclosure are further illustrated by and described with reference to an apparatus diagram and a flowchart that relate to time-variable decision feedback equalization.

FIG. 1 illustrates an example of a system 100 that supports time-variable decision feedback equalization in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-$a$, local memory controller 165-$b$, local memory controller 165-N) and a memory array 170 (e.g., memory array 170-$a$, memory array 170-$b$, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be ×4 (e.g., including four signal paths), ×8 (e.g., including eight signal paths), ×16 (including sixteen signal paths), etc.

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of an M-ary modulation scheme where M is equal to two. Each symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some examples, a non-binary symbol (or multi-level) modulation scheme may be used to modulate signals communicated between the host device 105 and the memory device 110. A non-binary modulation scheme may be an example of an M-ary modulation scheme where M is greater than or equal to three. Unlike a binary-symbol modulation scheme, each symbol of a non-binary modulation scheme may be operable to represent more than one bit of digital data (e.g., a symbol may represent a logic 00, a logic 01, a logic 10, or a logic 11). Examples of non-binary modulation schemes include, but are not limited to, PAM3, PAM4, PAM8, etc., quadrature amplitude modulation (QAM), quadrature phase shift keying (QPSK), and/or others. A non-binary signal (e.g., a PAM3 signal or a PAM4 signal) may be a signal that is modulated using a modulation scheme that includes at least three levels to encode more than one bit of information. Non-binary modulation schemes and symbols may alternatively be referred to as non-binary, multi-bit, or higher-order modulation schemes and symbols.

A memory device 110 may receive information signals (e.g., data signals, control signals, clock signals, etc.) from a host device 105 via one or more channels 115—e.g., during a write operation. Similarly, a host device 105 may receive information signals from a memory device 110 via the one or more channels 115—e.g., during a read operation. In some examples, channel characteristics (e.g., a frequency response of the channel, impedance matching of the channel, etc.) may affect the transmission of the information signals over the channels. In some examples (e.g., due to an impedance mismatch between a conductive line and termination point) reflections of an information signal may develop on a channel. The reflections of the information signal may be time-delayed and attenuated versions of the information signal that combine with later portions of the information signal, causing an altered information signal (relative to the information signal transmitted from the transmitter) to be received at the receiving device.

The memory device 110 may include a decision circuit that determines a voltage level for a received information signal. In some examples, the decision circuit may periodically sample the received information signal in accordance with a rising and/or falling edge of a clock. Each time the decision circuit samples the received signal may be referred to as a sampling event. The sampling events may be separated from one another by a set duration that is based on the clock frequency, also referenceable as a unit interval. The decision circuit may compare, at a sampling event, a voltage of the received information signal against one or more threshold voltages and output a voltage having a particular voltage level based on the comparison—e.g., a voltage that greater than or less than a threshold voltage or that is between a pair of threshold voltages. In some examples, the changes to the information signal caused by the reflections cause the decision circuit to output a signal having voltage levels that are inconsistent with the voltage level of the information signal originally transmitted from the host device 105, resulting in data storage/retrieval errors.

To compensate for the changes to the transmitted signal that may occur during transmission, a receiving device (e.g., the host device 105 or the memory device 110) may apply an equalization technique to received information signals. For example, a receiving device may use a DFE circuit that includes a decision circuit (which may be or include a slicer), a delay circuit (which may include one or more delay elements, also referenceable as tap delays), and a variable gain (also referenceable as a scaling circuit and which may include one or more variable gain amplifiers). The decision circuit may determine a voltage level of a signal received at an input of the decision circuit—e.g., by comparing the voltage level of the signal with one or more threshold voltages. The decision circuit may output a signal (also referenceable as an output signal) that transitions between different voltage levels of a set of possible voltage levels based on the comparison.

The signal output by the decision circuit may be received by the delay circuit, which may output one or more delayed versions of the output signal (also referenceable as delay signals). In some examples, the delay circuit includes one or more delay elements, where each delay element outputs a respective delay signal having a respective delay relative to the output signal. In some examples, each delay element outputs a delay signal that is delayed relative to the output signal by a duration that is an integer multiple of the unit interval (e.g., one unit interval, two unit intervals, etc.). In some examples, one or more delay elements may output a delay signal that is delayed by a duration that is not an integer multiple of the unit interval (e.g., one-and-a-half unit intervals, one-and-a-three-quarter unit intervals, etc.), and may be referred to as fractional delay elements.

The variable gain may receive the delayed signals and output scaled versions of the delay signals (also referenceable as feedback signals). In some examples, the variable gain outputs a feedback signal that has a smaller magnitude than a corresponding delay signal received at the variable gain—e.g., the magnitude of the feedback signal may match the magnitude of the reflected component of the input signal.

In some examples, the feedback signal may be applied to a subtraction circuit that also receives the information signal from the transmitting device. The subtraction circuit may subtract the feedback signal from the information signal, which may result in the reflected components of the information signal being reduced (or cancelled) by the scaled versions of the one or more delay signals. The subtraction circuit may output a modified signal based on the subtraction, where the modified signal may be received at the decision circuit. In other examples, the feedback signal may be applied to a threshold generation circuit and used to modify the threshold voltages used by the decision circuit. In such cases, the received information signal may be directly inputted into a first input of the decision circuit and the modified threshold voltages may be directly inputted into a second input of the decision circuit (and the decision circuit may be or include a comparator). In some examples, a training procedure is used to tune the gain of the variable gain to optimally reduce the reflected components of the received information signal—e.g. by aligning a magnitude of one or more feedback signals with a magnitude of one or more corresponding reflections.

However, a performance of the DFE circuit may be limited based on the type, quantity, and/or fixed time-delay of delay elements included in a delay circuit. That is, in some examples, a DFE circuit solely includes delay elements that introduce delays that are integer multiples of the unit interval. In such cases, if the reflections of the information signal are delayed by a non-integer multiple of the unit interval, the feedback signal may not be aligned (or may be poorly aligned) with the reflections of the information signal, reducing a cancellation performance of the feedback signal. In some examples, to better align the feedback signal with the reflections and improve the equalization performance, the DFE circuit may also include fractional delay elements that introduce delays that are non-integer multiples of the unit interval. However, increasing the quantity of delay elements in the DFE circuit to also include fractional delay elements may increase a complexity, footprint, and/or power consumption of the DFE circuit.

Additionally, or alternatively, the DFE circuit may include a limited quantity of fixed-delay delay elements (e.g., less than 3 delay elements)—e.g., to save power, reduce complexity, reduce footprint, etc. In such cases, the limited quantity of delay elements may generate a set of fixed time-delayed signals that fail to overlap with more significant reflections that occur with non-overlapping delays. Thus, significant reflections may be passed to an input of a decision circuit without any compensation. For example, if the DFE circuit includes a first delay element that applies a unit interval of delay and a second delay element that applies three unit intervals of delay, reflections having two unit intervals of delay may not be reduced by the DFE circuit. In some examples, to avoid missing reflections, a DFE circuit may be configured with a large quantity of delay elements (e.g., full and fractional delay elements), and a set of delay elements that reduces the reflections by a threshold amount may be activated. However, including and supporting a large quantity of delay elements may increase a complexity and footprint of the DFE circuit.

To improve a performance of a DFE circuit while using a reduced quantity of delay elements, a DFE circuit may be configured to include variable time-delay elements. The DFE circuit may include a decision circuit that determines a voltage level of a received information signal and generates an output information signal; a delay circuit that includes one or more variable time-delay elements and generates one or more delayed signals based on the output information signal; and a variable gain circuit that includes one or more variable gain amplifiers and generates a feedback signal based on the one or more delayed signals. In some examples, delay parameters of the one or more delay elements may be programmable or adjustable so that the delay signals generated by the delay circuit align in time with significant reflections of the received information signal. Techniques for determining the delay parameters for the delay element elements may include minimum mean square error techniques that are based on a received information signal and corresponding output information signal.

Figure 2:
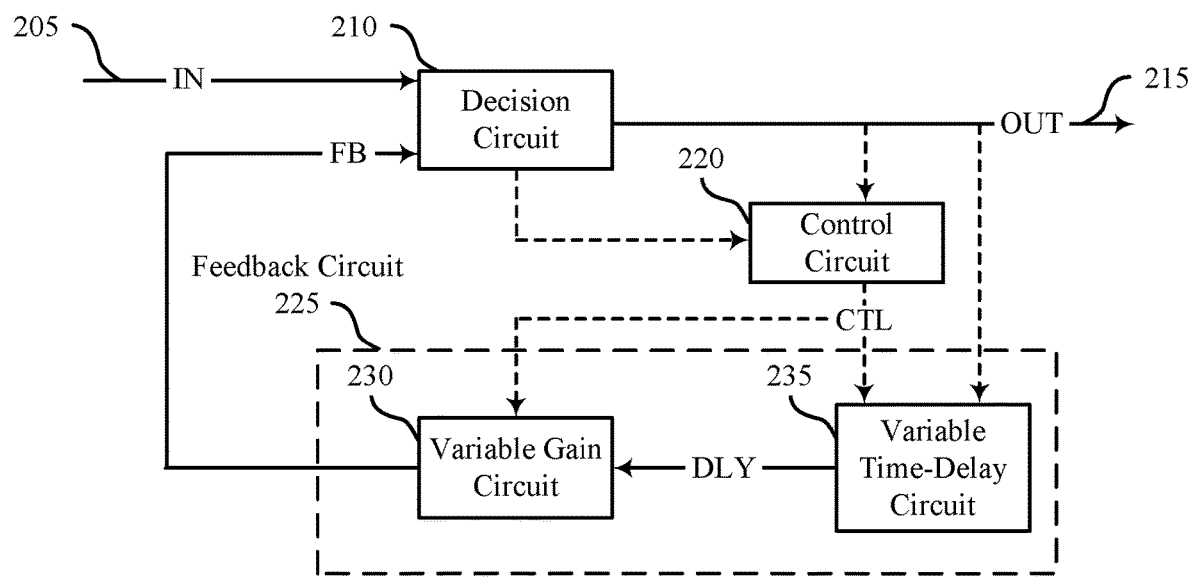
FIG. 2 illustrates an example of a circuit that supports time-variable decision feedback equalization in accordance with examples as disclosed herein.

FIG. 2 illustrates an example of a circuit that supports time-variable decision feedback equalization in accordance with examples as disclosed herein. Circuit 200 includes a collection of components that are configured to perform decision feedback equalization using variable time-delay elements. Circuit 200 may include input line 205, decision circuit 210, output line 215, control circuit 220, and feedback circuit 225. Feedback circuit 225 may include variable gain circuit 230 and variable time-delay circuit 235.

Input line 205 may be a conductive line that couples a transmitting device (e.g., a host device) with a receiving device (e.g., a memory device). In some examples, input line 205 is coupled with (or a part of) a channel, such as channel 115 of FIG. 1. In some examples, a channel response for input line 205 may be determined or estimated—e.g., during a testing or modeling phase. The channel response may indicate a signal that will develop on input line 205 in response to a signal being transmitted over input line 205. In some examples, a signal located at an end of input line 205 may be different than a signal located at a beginning of input line 205 (near the transmitting device). Additionally, or alternatively, reflections of the signal transmitted over input line 205 may occur after the initial transmission, where the reflections may be delayed in time and attenuated relative to the initial transmission. In some examples, reflections of the signal may interfere with other signals (or other portions of a same signal) that are subsequently transmitted over input line 205.

Decision circuit 210 may be configured to determine a voltage of a received signal that corresponds to a signal that is transmitted over input line 205. In some examples, the signal that is transmitted over input line 205 may referred to as an input (IN) signal. The input signal may include (or represent) information for storage in a memory array or that has been read from a memory array. At discrete instances (also referenceable as sampling events) decision circuit 210 may compare the received signal against one or more thresholds to determine a voltage of the received signal at each instance. For example, if one threshold is used, decision circuit 210 may determine, at a first sampling event, a first voltage (e.g., 1V) for the signal if a voltage of the received signal is above a threshold and a second voltage (e.g., 0V) for the signal if a voltage of the received signal is below a threshold. Decision circuit 210 may output a signal that transitions between a set of voltages based on the comparison—that is, decision circuit 210 may output a digitized signal. The signal output by decision circuit 210 may be referred to as an output (OUT) signal. The output signal may include (or represent) information for storage in a memory array or that has been read from a memory array. In some examples, decision circuit 210 may include a comparator. In some examples, decision circuit 210 may include a subtraction circuit and an analog-to-digital signal converter or comparator. In some examples, the comparator is a multi-level comparator. The analog-to-digital signal converter and/or the comparator may also be referred to as a slicer.

Output line 215 may be configured to couple the output of decision circuit 210 with a storage or data processing component. In some examples, output line 215 may be coupled with a controller that is used to access a memory array or with the memory array itself. In other examples, output line 215 may be coupled with a processor at a host device that is configured to use the data in the output signal to perform a function.

Control circuit 220 may be configured to tune delay parameters for variable time-delay circuit 235. Additionally, or alternatively, control circuit 220 may be configured to tune scaling parameters for variable gain circuit 230. Control circuit 220 may be configured to generate a control (CTL) signal based on comparing a signal output by decision circuit 210 with a signal input to decision circuit 210. Control circuit 220 may use a minimum mean square technique to generate the control signal. In some examples, control circuit 220 includes a subtraction circuit that subtracts an output signal from a signal input to decision circuit 210 to generate a control signal. In other examples, control circuit 220 also includes subtraction circuit that subtracts an output signal from a signal input to decision circuit 210, a delay circuit that delays the resulting signal, and an additional subtraction circuit that subtracts the resulting signal from a delayed version of the resulting signal to generate the control signal.

In some examples, control circuit 220 may be configured to generate a control signal solely for variable time-delay circuit 235. In some examples, control circuit 220 may be configured to first generate a control signal that sets the delay parameters of variable time-delay circuit 235 and next generate a control signal that sets the scaling parameters of variable gain circuit 230—a switching component may be used to route the control signal to the appropriate circuit.

Feedback circuit 225 may be configured to generate a feedback signal based on a signal output by decision circuit 210 that enables decision circuit 210 to compensate for interference in the input signal. Feedback circuit 225 may be further configured to generate the feedback signal based on a control signal received from control circuit 220. That is, feedback circuit may vary a delay and weight of the feedback signals based on the control signal.

Variable time-delay circuit 235 may be configured to generate one or more delay (DLY) signals based on the signal output by decision circuit 210, where a delay between the different delay signals and the output signal may be different. In some examples, the amount of delay between the one or more delayed signals and the output signal may be variable based on a quantity of delay elements included in variable time-delay circuit 235 and a timing and magnitude of reflections in the input signal. In some examples, variable time-delay circuit 235 applies delays that result in delay signals that are aligned in time with reflections of the input signal. In some examples, variable time-delay circuit 235 applies delays that result in delay signals that are aligned with a subset of the reflections that increase (e.g., optimize) a cancelling effect of the feedback signal on the reflections. Variable time-delay circuit 235 may include one or more variable time-delay circuits, which may each include one or more delay elements (e.g., clocked latches, capacitive elements, etc.). In some examples, time-delay parameters for the one or more variable time-delay circuits are set based on the control signal output by control circuit 220.

Variable gain circuit 230 may be configured to generate one or more feedback (FB) signals based on one or more delay signals received from variable time-delay circuit 235. Variable gain circuit 230 may be configured to apply scaling factors to the one or more delay signals to obtain scaled versions of the delay signal. In some examples, variable gain circuit 230 may modify (e.g., reduce or increase) a magnitude of the delay signals to match a magnitude of a reflection that is aligned in time with a corresponding delay signal. Variable gain circuit 230 may include one or more variable gain amplifiers. In some examples, a gain of the variable gain amplifiers is set based on the control signal output by control circuit 220.

Figure 3:
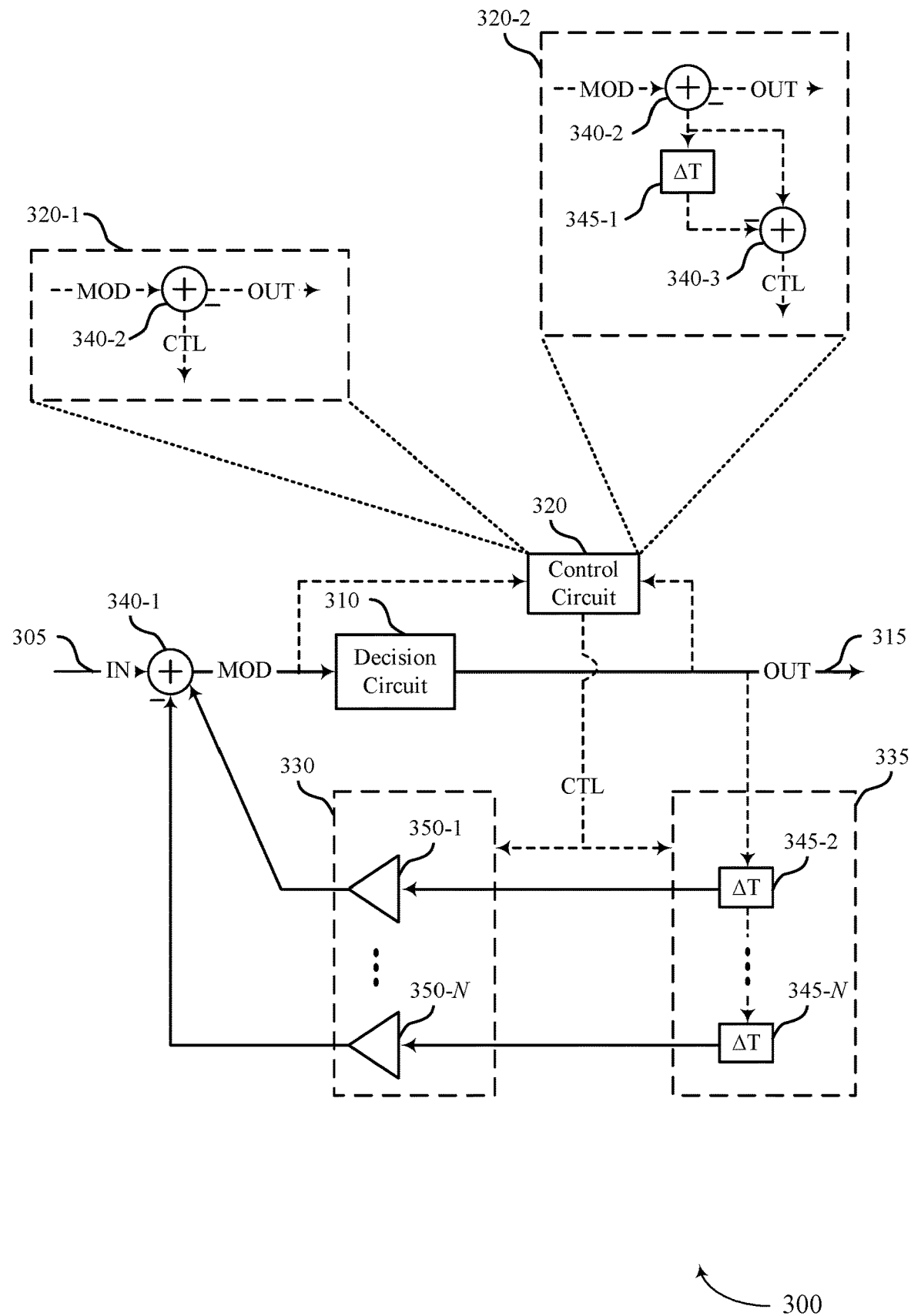
FIG. 3 illustrates an example of a circuit that supports time-variable decision feedback equalization in accordance with examples as disclosed herein.

FIG. 3 illustrates an example of a circuit that supports time-variable decision feedback equalization in accordance with examples as disclosed herein. Circuit 300 includes a collection of components that are configured to perform decision feedback equalization using variable time-delay elements. Circuit 300 may be an example of circuit 200, as described with reference to FIG. 2. Circuit 300 may include input line 305, decision circuit 310, control circuit 320, output line 315, variable gain circuit 330, and variable time-delay circuit 335, which may be examples of input line 205, decision circuit 210, control circuit 220, output line 215, and variable gain circuit 230 described with reference to FIG. 2. Circuit 300 may also include first subtraction circuit 340-1. Variable time-delay circuit 335 and second control circuit 320-2 may include one or more delay elements 345. Variable gain circuit 330 may include one or more variable gain amplifiers 350.

First subtraction circuit 340-1 may be configured to subtract the feedback signal from the received input signal to obtain a compensated signal, also referenceable as a modified (MOD) signal. In some examples, the modified signal corresponds to the input signal with reduced (or no) reflections. Thus, a voltage profile of the modified signal may correspond more closely to the voltage profile of the originally transmitted signal, and the likelihood that decision circuit 310 determines an incorrect voltage level (a voltage level that does not match the corresponding voltage level of the originally transmitted signal) for the modified signal may be reduced.

Multiple options for configuring the control circuit 320 may be available. In some examples, circuit 300 is configured with first control circuit 320-1. First control circuit 320-1 may include second subtraction circuit 340-2, which may be configured to subtract the signal output by decision circuit 310 from the modified signal input into decision circuit 310. The difference between the two signals may be output as a control signal to variable time-delay circuit 335 and/or variable gain circuit 330. In some examples, variable time-delay circuit 335 may modify delay parameters based on the control signal, where the larger the difference between the two signals, the larger the delay parameter modifications may be. Thus, as the difference between the output signal and the modified signal get smaller, the delay parameters may become more stable. Similarly, if the control signal is provided to variable gain circuit 330, variable gain circuit 330 the size of modifications the scaling parameters may be based on the difference between the two signals.

In some examples, circuit 300 is configured with second control circuit 320-2. Second control circuit 320-2 may similarly include second subtraction circuit 340-2. Also, second control circuit 320-2 may include first delay element 345-1 which may be configured to output a delayed version of the signal output by second subtraction circuit 340-2 (also referenceable as an error signal). And second control circuit 320-2 may include third subtraction circuit 340-3, which may be configured to subtract the delayed error signal from the error signal and output the control signal. By subtracting the delayed error signal from the error signal, an error gradient between the modified signal and output signal may be used to control the variable time-delay circuit 335 and/or variable gain circuit 330. Thus, if the error between the modified signal and output signal reaches a steady state offset, variable time-delay circuit 335 may maintain the delay parameters at their current values. Similarly, if the control signal is provided to variable gain circuit 330, variable gain circuit 330 may maintain the scaling parameters at their current values. By comparison to first control circuit 320-1, second control circuit 320-2 may prevent variable time-delay circuit 335 and/or variable gain circuit 330 from continuously changing delay and scaling parameters when a difference between the modified signal and the output signal does not settle at a zero value. In some examples, both first control circuit 320-1 and second control circuit 320-2 are configured to first tune the delay parameters of variable time-delay circuit 335 and subsequently tune the scaling parameters of variable gain circuit 330.

Variable time-delay circuit 335 may include second delay element 345-2 through Nth delay element 345-N. In some examples, variable time-delay circuit 335 may include one variable time-delay element (e.g., a single variable time-delay element) or may include additional variable time-delay elements. In some examples, second delay element 345-2 may apply a first delay to the output signal and output a delayed signal to an adjacent delay element and to a variable gain amplifier (e.g., first variable gain amplifier 350-1). In some examples, the first delay causes a voltage peak of the first delay signal to cancel out a dispersed component of a received signal. In some examples, the first delay causes a voltage peak of the first delay signal to be aligned in time with a voltage peak of a reflection of a portion of the input signal received at a first sampling event. The adjacent delay element (e.g., Nth delay element 345-N) may apply an additional delay to the signal output by second delay element 345-2 and output another delayed signal to another variable gain amplifier (e.g., Nth variable gain amplifier 350-N). In some examples, the summation of the first delay and second delay causes a voltage peak of the second delay signal to be aligned in time with a voltage peak of another reflection of a portion of the input signal received at a first sampling event.

In some examples, variable time-delay circuit 335 may include one or more fixed time-delay elements and one or more variable time-delay elements. For example, second time-delay element 345-2 may be replaced with a fixed time-delay element. In such cases, the fixed time-delay element may be aligned with a signal component (e.g., a reflection or a dispersed component) of a received signal observed within the second time delay. The signal component aligned with the fixed time-delay element may have the largest magnitude of the transient signal components included in the received signal. Also, the variable time-delay elements may be tuned to cancel out other signal components (e.g., reflections) of the received signal that occur after the signal component (e.g., the initial reflection or the dispersed component) and may have smaller magnitudes than the signal component.

Variable gain circuit 330 may include first variable gain amplifier 350-1 and Nth variable gain amplifier 350-N. In some examples, variable gain circuit 330 may include one variable gain amplifier (e.g., a single variable gain amplifier) or may include additional variable gain amplifiers. In some examples, first variable gain amplifier 350-1 applies a first scaling factor to a delay signal received from second delay element 345-2 and outputs the scaled signal to first subtraction circuit 340-1. In some examples, the first scaling factor causes a magnitude of the voltage peak of the first delay signal to match (e.g., nearly) the magnitude of the reflection. Also, Nth variable gain amplifier 350-N may apply a second scaling factor to an Nth delay signal received from Nth delay element 345-N and output the scaled signal to first subtraction circuit 340-1. In some examples, the Nth scaling factor causes a magnitude of the voltage peak of the Nth delay signal to match (e.g., nearly) the magnitude of the other reflection.

Figure 4:
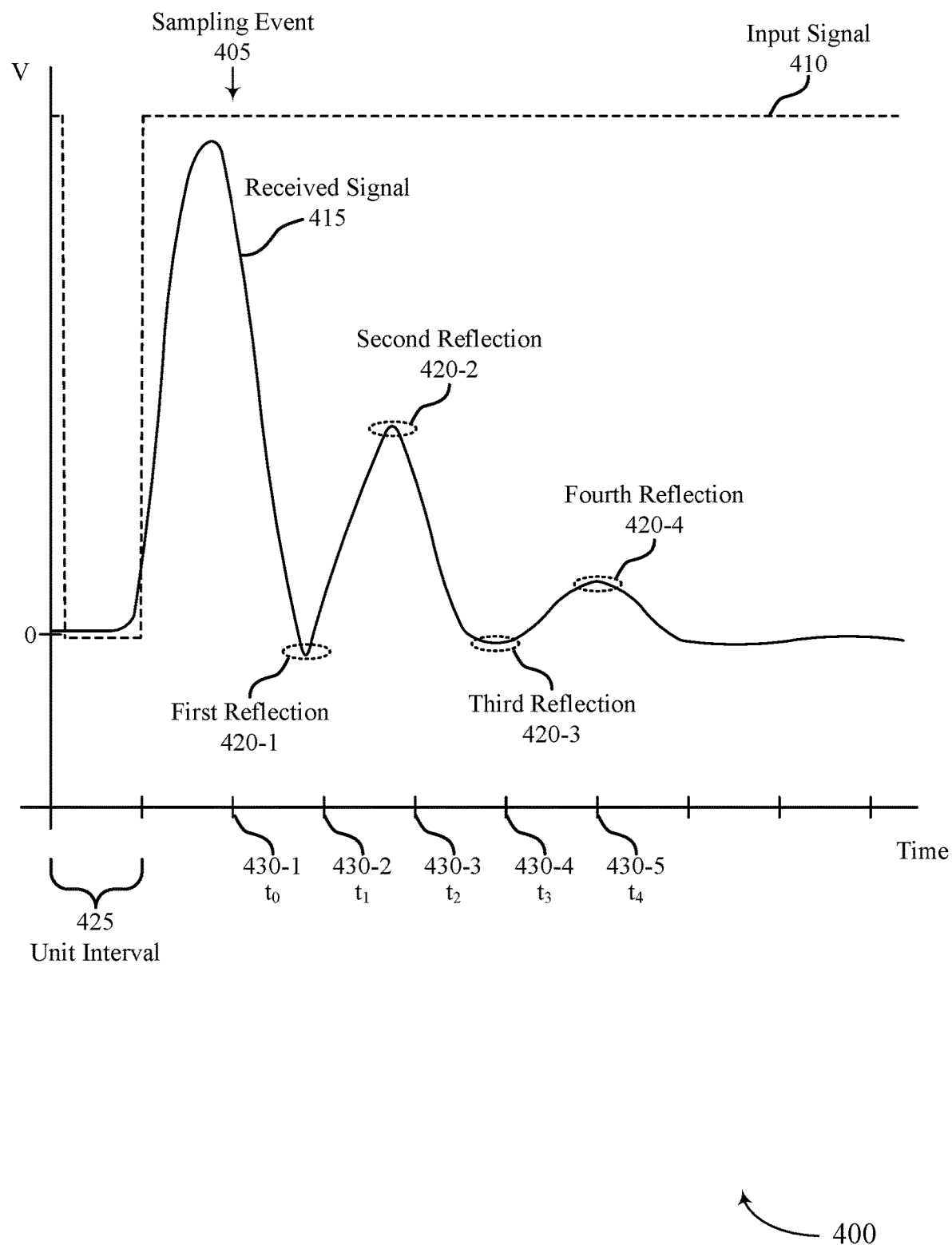
FIG. 4 illustrates an example of a signal diagram that supports time-variable decision feedback equalization in accordance with examples as disclosed herein.

FIG. 4 illustrates an example of a signal diagram that supports time-variable decision feedback equalization in accordance with examples as disclosed herein. Signal diagram 400 depicts a response of a conductive line (or channel) to the transmission of a transmitted signal. Input signal 410 may be a voltage pulse. Received signal 415 may be the signal that results on the conductive line (e.g., near the receiving device) in response to the transmission of input signal 410 over the conductive line. The time axis of signal diagram 400 may be partitioned into unit intervals 425, where a duration of a unit interval 425 may correspond to a frequency of a clock used by a receiving device. In some examples, a duration of a unit interval 425 corresponds to a duration between positive edges of a clock, a duration between negative edges of a clock, or a duration between a positive edge and negative edge of a clock. A receiving device may be configured to sample a signal that is present on the conductive line at a beginning (or end) of each unit interval.

As depicted in signal diagram 400, received signal 415 may include multiple signal components, including a first signal component that occurs a first duration after the pulse is applied (e.g., around first time 430-1, also referenceable as $t_0$), where the first duration may be based on a propagation delay of the conductive line. In some examples, the signal components may also be referred to as signal characteristics, and the signal components that occur after first time 430-1 may be referred to as transient components or reflections of received signal 415.

Received signal 415 may also include a second signal component (also referenceable as first reflection 420-1) that occurs a second duration after the pulse is applied (e.g., around second time 430-2, also referenceable as $t_1$). Received signal 415 may also include a third signal component (also referenceable as second reflection 420-2) that occurs a third duration after the pulse is applied (e.g., around third time 430-3, also referenceable as $t_2$). Received signal 415 may also include a fourth signal component (also referenceable as third reflection 420-3) that occurs a fourth duration after the pulse is applied (e.g., around fourth time 430-4, also referenceable as $t_3$). Received signal 415 may also include a fifth signal component (also referenceable as fourth reflection 420-4) that occurs a fifth duration after the pulse is applied (e.g., around fifth time 430-5, also referenceable as $t_4$). In some examples, received signal 415 may include fewer or more reflections. As depicted in signal diagram 400, the peak of the different reflection may not be perfectly aligned with a beginning/end of a unit interval but may be offset by some amount. Additionally, the peak of some reflection may be at or near a zero value. In some examples, reflections are identified as signal components that occur after the initial transmission and have a magnitude that exceeds a threshold. The reflections of received signal 415 may affect (e.g., combine with) output signals resulting from subsequent pulses of input signal 410 (not shown). For example, if input signal 410 transitioned from a high voltage to a low voltage at second time 430-2, second reflection 420-2 may combine with a first signal component of the resulting output signal, increasing or decreasing a voltage of the resulting output signal.

As described herein, a DFE circuit may be used to compensate for the reflections by generating a feedback signal that cancels out the reflections. The DFE circuit may include a decision circuit that samples a voltage of received signal 415 at first time 430-1 (e.g., which may correspond to sampling event 405) and outputs a voltage level based on the sample voltage. For example, for a binary modulation scheme, if the decision circuit determines that the voltage of received signal 415 is greater than a threshold voltage, the decision circuit may output a high voltage.

In some examples, the DFE circuit may also include one or more fixed time-delay elements that output delayed versions of the signal output by the decision circuit, where the delayed versions may also be referred to as delay signals. And the DFE circuit may include variable gain amplifiers that output scaled versions of the delay signals. In some examples, the fixed time-delay elements may introduce delays that are an integer multiple of a duration of a unit interval 425. Thus, the variable gain amplifiers may generate scaled signals having peaks that are aligned with a beginning/end of a unit interval. As described herein, in some cases, the peaks of the reflections may not be aligned with a beginning/end of a unit interval, reducing a cancellation effect of the scaled signals. As also described herein, in some examples, the fixed time-delay elements may introduce delays that are not an integer multiple of a duration of a unit interval 425 (e.g., using fractional delay elements). In such cases, the variable gain amplifiers may generate scaled signals that have peaks that are aligned with peaks of one or more reflections.

However, to align the peaks of the scaled signals with the peaks of one or more reflections using fixed time-delay element, the DFE circuit may be configured with an excessive quantity of delay elements—e.g., to ensure that the proper delay can be applied to received signal 415. To align the peaks of the scaled signals with the peaks of one or more reflections with a reduced quantity of delay elements, the DFE circuit may be configured with variable time-delay elements. Using variable time-delay elements, the DFE circuit may modify the delay of the delay elements so that peaks of the corresponding scaled signals are aligned with peaks of one or more reflections. In some examples, the DFE circuit includes one or more fixed time-delay elements and one or more variable time-delay elements.

In some examples, the DFE circuit may include as many delay elements as reflections included in received signal 415. In such cases, the first delay element may be tuned to apply a delay to a signal output by the decision circuit that corresponds to a duration between sampling event 405 and a peak of first reflection 420-1, the second delay element may be tuned to apply a delay to the signal output by the decision circuit that corresponds to a duration between sampling event 405 and a peak of second reflection 420-2, and so on.

In other examples, the DFE circuit may include less delay elements than reflections included in received signal 415. In such cases, delays of one or more variable time-delay elements may be configured to cancel out a reflection or combination of reflections that have the largest effect on subsequent signals. For example, if the DFE circuit includes one variable time-delay element, the DFE circuit may be configured to set a time-delay for the variable time-delay element to be equal to the duration between sampling event 405 and second reflection 420-2—e.g., to cancel out the second reflection 420-2. In another example, if the DFE circuit includes two variable time-delay elements, the DFE circuit may be configured to set a time-delay for a first time-delay element to be equal to the duration between sampling event 405 and second reflection 420-2 and a time-delay for the second time-delay element to be equal to the duration between sampling event 405 and fourth reflection 420-4—e.g., to cancel out the second reflection 420-2 and fourth reflection 420-4. In some examples, if the DFE circuit includes a fixed time-delay element and a variable time-delay element, the DFE circuit may be configured so that the fixed time-delay element cancels out a dispersed component of receiving signal 415 (e.g., at first time 430-1), and variable time-delay element may be tuned to cancel out second reflection 420-2.

In some examples, to determine which reflections to cancel, reflections having a magnitude that exceed a first threshold (e.g., 0.2V) may be identified, and the available time-delay elements may be tuned to align the feedback signals with the identified reflections. If there are remaining time-delay elements, remaining reflections having a magnitude that exceed a second threshold (e.g., 0.1V) may be identified, and the available time-delay elements may be tuned to align another set of feedback signals with the identified reflections. And so on, until there are no remaining reflections to cancel or no available time delay elements left to tune.

As described herein, the DFE circuit may use different techniques to generate a control signal that is used to tune the variable time-delay elements and/or the variable gain elements—e.g., using a minimum mean square estimation technique. In some examples, the DFE circuit first uses the control signal to tune the variable time-delay elements, where a variable time-delay circuit including the variable time-delay elements may modify a first time-delay element based on the control signal, then modify a second time-delay element based on the control signal when a magnitude (or rate of change) of the error signal falls below a threshold, and so on. After tuning the variable time-delay elements, the DFE circuit may use the control signal to tune the variable gain amplifiers, where a variable gain circuit including the variable gain amplifiers may modify a first variable gain amplifier based on the control signal, then a second variable gain amplifier based on the control signal when a magnitude (or rate of change) of the error signal falls below a threshold, and so on.

In some examples, a response of a conductive line may be estimated, measured, or modeled prior to deployment of a memory device, and a timing and magnitude of a set of resulting reflections may be determined or estimated accordingly. After identifying the timing and magnitude of the reflections, the time-delay of a set of available variable time-delay elements may be programmed based on the identified timing and magnitude of the resulting reflections. For example, the set of available variable time-delay elements may be tuned to generate feedback signals that cancel out (or reduce the magnitude of) the more impactful reflections (e.g., second reflection 420-2 and fourth reflection 420-4). In some examples, the time-delay for the variable time-delay element is set by blowing one or more fuses (e.g., melting a filament in the one or more fuses) included in the time-delay element that are used to set a timing of the variable time-delay element.

Figure 5:
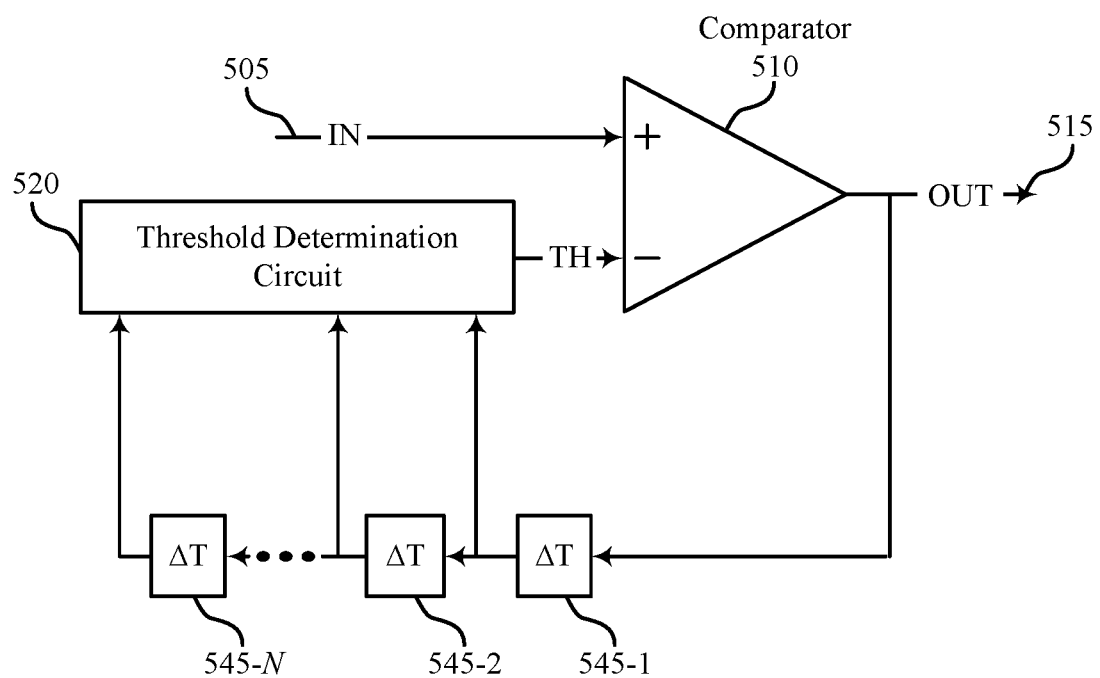
FIG. 5 illustrates an example of a circuit that supports time-variable decision feedback equalization in accordance with examples as disclosed herein.

FIG. 5 illustrates an example of a circuit that supports time-variable decision feedback equalization in accordance with examples as disclosed herein. Circuit 500 includes a collection of components that are configured to perform decision feedback equalization using variable time-delay elements. Circuit 500 may depict an alternative configuration for a decision feedback equalization circuit—e.g., relative to circuit 300 of FIG. 3. That is, rather than applying a feedback signal to an input signal received over input line, circuit 500 may perform feedback equalization by modifying a level of the threshold voltage that is compared with a voltage of the input signal. Circuit 500 may include input line 505, output line 515, and delay elements 545, which may be respective examples of input line 305, output line 315, and delay elements 345, as described in FIG. 3. Circuit 500 may also include comparator 510 and threshold determination circuit 520.

Comparator 510 may be configured to compare an input signal received over input line 505 with a dynamic threshold signal output by threshold determination circuit 520. Comparator 510 may also be configured to output an output signal having voltages that transition between a quantized set of voltage level based on the comparison. Threshold determination circuit 520 may be configured to modify a threshold voltage based on delay signals received from delay elements 545. In some examples, circuit 500 includes a control circuit that is used to tune a delay of delay elements 545 based on the signal input to comparator 510, the adjustment to the threshold signal, and the signal output by comparator 510, as similarly described herein. The control circuit may also be used to tune scaling parameters of variable gain amplifiers included in threshold determination circuit 520 based on the signal input to comparator 510, the adjustment to the threshold signal, and the signal output by comparator 510, as similarly described herein.

Figure 6:
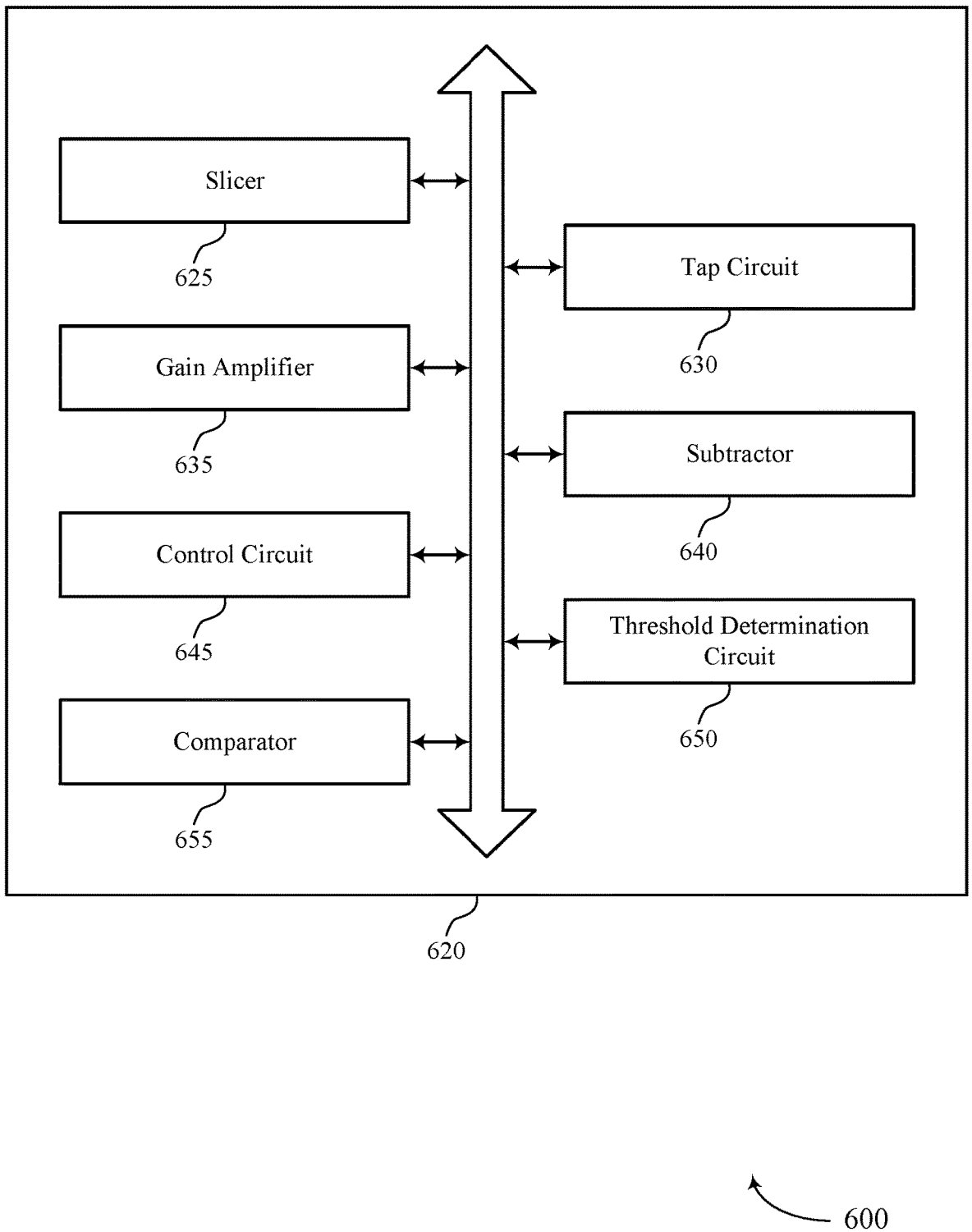
FIG. 6 shows a block diagram of a receiving device that supports time-variable decision feedback equalization in accordance with examples as disclosed herein.

FIG. 6 shows a block diagram 600 of a receiving device 620 that supports time-variable decision feedback equalization in accordance with examples as disclosed herein. The receiving device 620 may be an example of aspects of a host device or a memory device as described with reference to FIGS. 1 through 5. The receiving device 620, or various components thereof, may be an example of means for performing various aspects of time-variable decision feedback equalization as described herein. For example, the receiving device 620 may include a slicer 625, a tap circuit 630, a gain amplifier 635, a subtractor 640, a control circuit 645, a threshold determination circuit 650, a comparator 655, or any combination thereof. Each of these components may communicate, directly or indirectly, with one another (e.g., via one or more buses).

The slicer 625 may be configured as or otherwise support a means for determining, at a sampling event, a voltage of a first signal based at least in part on a feedback signal and an input signal that is received over a conductive line and is representative of data written to or read from a memory array. In some examples, the slicer 625 may be configured as or otherwise support a means for outputting a second signal having a voltage level that is based at least in part on determining the voltage of the first signal. The tap circuit 630 may be configured as or otherwise support a means for applying a variable time-delay to the second signal to output a delayed signal. The gain amplifier 635 may be configured as or otherwise support a means for generating the feedback signal based at least in part on the delayed signal.

In some examples, the tap circuit 630 may be configured as or otherwise support a means for setting, before the input signal is received, the variable time-delay to a first duration. In some examples, the tap circuit 630 may be configured as or otherwise support a means for setting, after the input signal is received, the variable time-delay to a second duration.

In some examples, the tap circuit 630 may be configured as or otherwise support a means for determining a duration of the variable time-delay based at least in part on magnitudes of one or more characteristics of the input signal and a timing of the one or more characteristics of the input signal after the sampling event.

In some examples, None, and the gain amplifier 635 may be configured as or otherwise support a means for determining the amplification factor based at least in part on the duration of the variable time-delay and a magnitude of a corresponding characteristics of the input signal.

In some examples, the subtractor 640 may be configured as or otherwise support a means for modifying the input signal based at least in part on the feedback signal to obtain the first signal. In some examples, the control circuit 645 may be configured as or otherwise support a means for determining a duration of the variable time-delay based at least in part on a difference between the first signal and the second signal.

In some examples, the control circuit 645 may be configured as or otherwise support a means for outputting an error signal based at least in part on a difference between the first signal and the second signal. In some examples, the control circuit 645 may be configured as or otherwise support a means for delaying the error signal to obtain a delayed error signal. In some examples, the control circuit 645 may be configured as or otherwise support a means for determining a difference between the error signal and the delayed error signal, where the duration of the variable time-delay is based at least in part on the difference between the error signal and the delayed error signal.

In some examples, the threshold determination circuit 650 may be configured as or otherwise support a means for adjusting a reference signal based at least in part on the feedback signal. In some examples, the comparator 655 may be configured as or otherwise support a means for comparing the first signal and the reference signal, where the first signal is equivalent to the input signal and the voltage level of the second signal is based at least in part on the comparing. In some examples, the slicer 625 may include or be the comparator 655.

Figure 7:
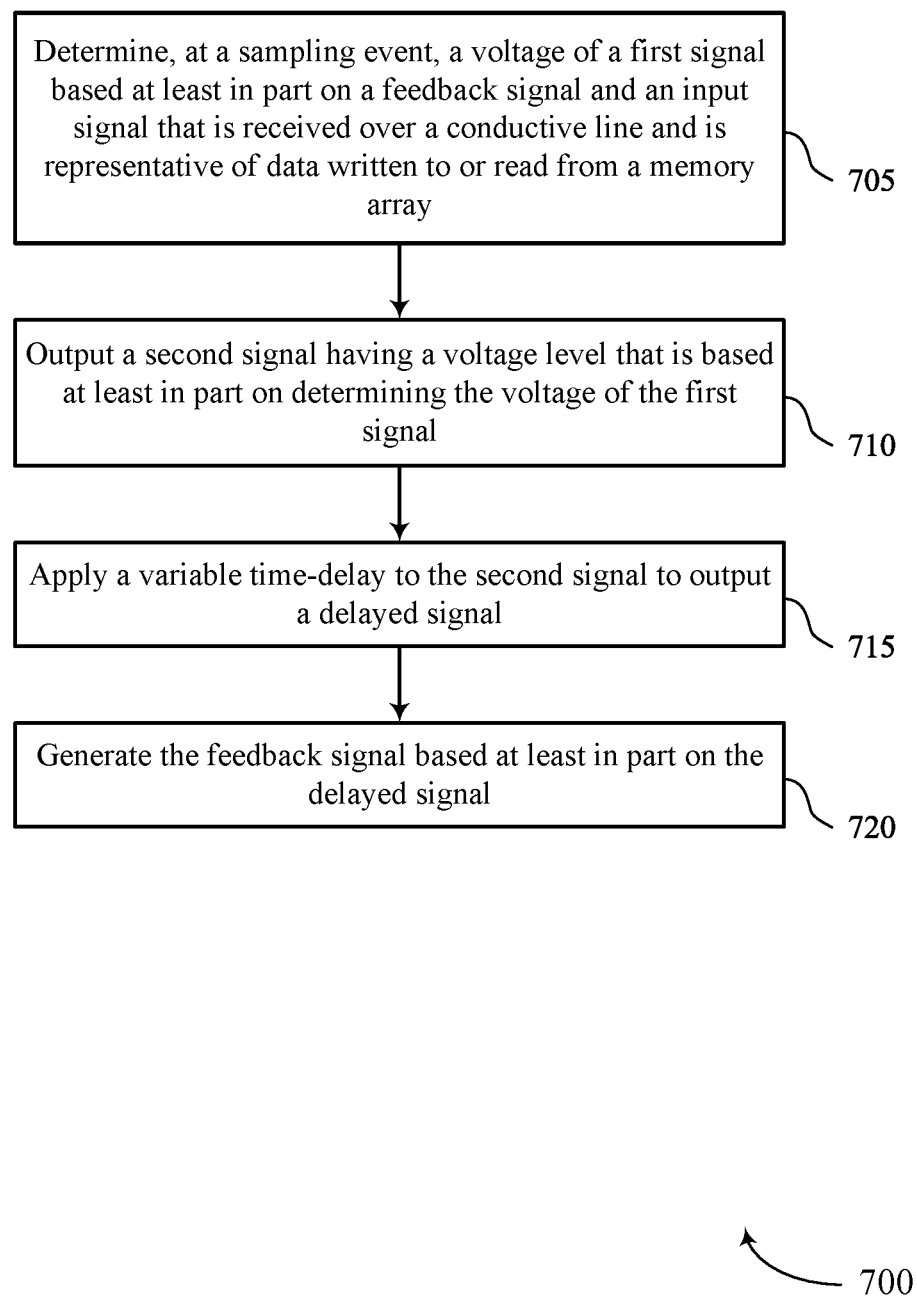
FIG. 7 shows a flowchart illustrating a method or methods that support time-variable decision feedback equalization in accordance with examples as disclosed herein.

FIG. 7 shows a flowchart illustrating a method 700 that supports time-variable decision feedback equalization in accordance with examples as disclosed herein. The operations of method 700 may be implemented by a receiving device or its components as described herein. For example, the operations of method 700 may be performed by a receiving device as described with reference to FIGS. 1 through 6. In some examples, a receiving device may execute a set of instructions to control the functional elements of the device to perform the described functions. Additionally, or alternatively, the receiving device may perform aspects of the described functions using special-purpose hardware.

At 705, the method may include determining, at a sampling event, a voltage of a first signal based at least in part on a feedback signal and an input signal that is received over a conductive line and is representative of data written to or read from a memory array. The operations of 705 may be performed in accordance with examples as disclosed herein. In some examples, aspects of the operations of 705 may be performed by a slicer 625 as described with reference to FIG. 6.

At 710, the method may include outputting a second signal having a voltage level that is based at least in part on determining the voltage of the first signal. The operations of 710 may be performed in accordance with examples as disclosed herein. In some examples, aspects of the operations of 710 may be performed by a slicer 625 as described with reference to FIG. 6.

At 715, the method may include applying a variable time-delay to the second signal to output a delayed signal. The operations of 715 may be performed in accordance with examples as disclosed herein. In some examples, aspects of the operations of 715 may be performed by a tap circuit 630 as described with reference to FIG. 6.

At 720, the method may include generating the feedback signal based at least in part on the delayed signal. The operations of 720 may be performed in accordance with examples as disclosed herein. In some examples, aspects of the operations of 720 may be performed by a gain amplifier 635 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for determining, at a sampling event, a voltage of a first signal based at least in part on a feedback signal and an input signal that is received over a conductive line and is representative of data written to or read from a memory array, outputting a second signal having a voltage level that is based at least in part on determining the voltage of the first signal, applying a variable time-delay to the second signal to output a delayed signal, and generating the feedback signal based at least in part on the delayed signal.

In some examples of the method 700 and the apparatus described herein, setting, before the input signal may be received, the variable time-delay to a first duration and setting, after the input signal may be received, the variable time-delay to a second duration.

Some examples of the method 700 and the apparatus described herein may further include operations, features, circuitry, logic, means, or instructions for determining a duration of the variable time-delay based at least in part on magnitudes of one or more characteristics of the input signal and a timing of the one or more characteristics of the input signal after the sampling event.

In some examples of the method 700 and the apparatus described herein, and the method, apparatuses, and non-transitory computer-readable medium may include further operations, features, circuitry, logic, means, or instructions for determining the amplification factor based at least in part on the duration of the variable time-delay and a magnitude of a corresponding characteristics of the input signal.

Some examples of the method 700 and the apparatus described herein may further include operations, features, circuitry, logic, means, or instructions for modifying the input signal based at least in part on the feedback signal to obtain the first signal and determining a duration of the variable time-delay based at least in part on a difference between the first signal and the second signal.

Some examples of the method 700 and the apparatus described herein may further include operations, features, circuitry, logic, means, or instructions for outputting an error signal based at least in part on a difference between the first signal and the second signal, delaying the error signal to obtain a delayed error signal, and determining a difference between the error signal and the delayed error signal, where the duration of the variable time-delay may be based at least in part on the difference between the error signal and the delayed error signal.

Some examples of the method 700 and the apparatus described herein may further include operations, features, circuitry, logic, means, or instructions for adjusting a reference signal based at least in part on the feedback signal and comparing the first signal and the reference signal, where the first signal may be equivalent to the input signal and the voltage level of the second signal may be based at least in part on the comparing.

It should be noted that the methods described herein describe possible implementations, and that the operations and the steps may be rearranged or otherwise modified and that other implementations are possible. Further, portions from two or more of the methods may be combined.

An apparatus is described. The apparatus may include a memory array, a first circuit coupled with the memory array and a conductive line configured to receive an input signal representative of data written to or read from the memory array and output a second signal, the first circuit configured to determine a voltage of a first signal at a sampling event based at least in part on the input signal and a feedback signal, a second circuit coupled with an output of the first circuit and configured to apply one or more variable time-delays to the second signal and output one or more delayed signals, and a third circuit coupled with the second circuit and the first circuit, the third circuit configured to generate the feedback signal based at least in part on the one or more delayed signals output by the second circuit.

In some examples of the apparatus, the first circuit includes a comparator, an analog-to-digital signal converter, a sense amplifier, or a combination thereof, the second circuit includes a clocked latch, one or more capacitors, or a combination thereof, and the third circuit includes a gain amplifier.

In some examples of the apparatus, the second circuit includes a delay element configured to receive the second signal and output a delayed signal based at least in part on applying a variable time-delay to the second signal and the second circuit may be configured to set a delay parameter of the delay element based at least in part on one or more characteristics of the input signal that occur after the sampling event.

In some examples of the apparatus, a first characteristic of the input signal occurs a first duration after the sampling event and a second characteristic of the input signal occurs a second duration after the sampling event that may be longer than the first duration, a magnitude of the first characteristic may be smaller than a magnitude of the second characteristic, and the second circuit may be configured to set the delay parameter of the delay element to be equal to the second duration based at least in part on the magnitude of the first characteristic being smaller than the magnitude of the second characteristic.

In some examples of the apparatus, before the input signal may be received, the delay parameter of the delay element may be equal to the first duration.

In some examples of the apparatus, a plurality of sampling events of the first signal include the sampling event, each of the plurality of sampling events separated by a time interval and the second duration may be separated from the sampling event by a plurality of time intervals.

In some examples of the apparatus, a plurality of sampling events of the first signal include the sampling event, each of the plurality of sampling events separated by a time interval and the second duration may be separated from the sampling event by at least one time interval and a portion of a second time interval that follows the at least one time interval.

In some examples of the apparatus, the second circuit includes a single delay element, the single delay element being equivalent to the delay element.

In some examples of the apparatus, the second circuit includes a plurality of delay elements configured to receive the second signal and output a plurality of delayed signals based at least in part on the second signal and the second circuit may be configured to set delay parameters of the plurality of delay elements based at least in part on a plurality of characteristics of the input signal.

In some examples of the apparatus, the plurality of characteristics of the input signal occur with a respective plurality of durations after the sampling event, a quantity of the plurality of delay elements may be less than a quantity of the plurality of characteristics, and the second circuit may be configured to set the delay parameters of the plurality of delay elements to be equal to durations associated with characteristics of the plurality of characteristics having an effect on the input signal during subsequent sampling intervals that exceeds a threshold.

In some examples of the apparatus, the one or more variable time-delays may be based at least in part on a magnitude of one or more characteristics of the input signal and a timing of the one or more characteristics of the input signal after the sampling event.

In some examples, the apparatus may include a fourth circuit coupled with the first circuit and configured to output an error signal for calibrating the second circuit based at least in part on the first signal and the second signal and where the second circuit may be configured to set durations of the one or more variable time-delays based at least in part on the error signal.

In some examples, the apparatus may include a subtraction circuit coupled with the first circuit and the third circuit, the subtraction circuit configured to output the first signal to the first circuit based at least in part on subtracting the input signal and the feedback signal.

In some examples of the apparatus, the fourth circuit includes a second subtraction circuit that may be configured to output the error signal based at least in part on subtracting the first signal and the second signal.

In some examples of the apparatus, the fourth circuit includes a second subtraction circuit that may be configured to output a first error signal based at least in part on subtracting the first signal and the second signal, a delay element configured to delay the first error signal to obtain a delayed error signal, and a third subtraction circuit configured to subtract the first error signal and the delayed error signal to obtain the error signal for calibrating the second circuit.

In some examples of the apparatus, the fourth circuit may be further configured to output a second error signal for calibrating the third circuit based at least in part on the input signal and the second signal and the second circuit being calibrated and the third circuit may be configured to set one or more amplification factors for the one or more delayed signals based at least in part on the second error signal.

In some examples, the apparatus may include a fourth circuit that includes the third circuit and may be configured to modify a reference signal based at least in part on the feedback signal and where the first circuit includes a comparator that may be configured to receive the input signal and the reference signal and generate the second signal based at least in part on the input signal and the reference signal, where the input signal may be equivalent to the first signal.

Another apparatus is described. The apparatus may include a memory array, a controller coupled with the memory array, the controller operable to cause the apparatus to, determine, at a sampling event, a voltage of a first signal based at least in part on a feedback signal and an input signal that is received over a conductive line and representative of data written to or read from the memory array, output a second signal having a voltage level that is based at least in part on determining the voltage of the first signal, apply a variable time-delay to the second signal to output a delayed signal, and generate the feedback signal based at least in part on the delayed signal.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
a memory array;
a first circuit coupled with the memory array and a conductive line configured to receive an input signal representative of data written to or read from the memory array and output a second signal, the first circuit configured to determine a voltage of a first signal at a sampling event based at least in part on the input signal and a feedback signal;
a second circuit coupled with an output of the first circuit and configured to apply one or more variable time-delays to the second signal and output one or more delayed signals, wherein the second circuit comprises a delay element circuit configured to receive the second signal and output a delayed signal based at least in part on applying a variable time-delay to the second signal, wherein the second circuit is further configured to set a delay parameter of the delay element circuit based at least in part on one or more characteristics of the input signal that occur after the sampling event, and wherein:
a first characteristic of the input signal occurs a first duration after the sampling event and a second characteristic of the input signal occurs a second duration after the sampling event that is longer than the first duration,
a magnitude of the first characteristic is smaller than a magnitude of the second characteristic, and
the second circuit is configured to set the delay parameter of the delay element circuit to be equal to the second duration based at least in part on the magnitude of the first characteristic being smaller than the magnitude of the second characteristic; and
a third circuit coupled with the second circuit and the first circuit, the third circuit configured to generate the feedback signal based at least in part on the one or more delayed signals output by the second circuit.

2. The apparatus of claim 1, wherein:
the first circuit comprises a comparator, an analog-to-digital signal converter, a sense amplifier, or a combination thereof;
the second circuit comprises a clocked latch, one or more capacitors, or a combination thereof; and
the third circuit comprises a gain amplifier.

3. The apparatus of claim 1, wherein, before the input signal is received, the delay parameter of the delay element circuit is equal to the first duration.

4. The apparatus of claim 1, wherein:
a plurality of sampling events of the first signal comprise the sampling event, each of the plurality of sampling events separated by a time interval, and
the second duration is separated from the sampling event by a plurality of time intervals.

5. The apparatus of claim 1, wherein:
a plurality of sampling events of the first signal comprise the sampling event, each of the plurality of sampling events separated by a time interval, and
the second duration is separated from the sampling event by at least one time interval and a portion of a second time interval that follows the at least one time interval.

6. The apparatus of claim 1, wherein:
the second circuit comprises a plurality of delay element circuits configured to receive the second signal and output a plurality of delayed signals based at least in part on the second signal, and
the second circuit is configured to set delay parameters of the plurality of delay element circuits based at least in part on a plurality of characteristics of the input signal.

7. The apparatus of claim 1, wherein the one or more variable time-delays are based at least in part on a magnitude of one or more characteristics of the input signal and a timing of the one or more characteristics of the input signal after the sampling event.

8. The apparatus of claim 1, further comprising:
a fourth circuit coupled with the first circuit and configured to output an error signal for calibrating the second circuit based at least in part on the first signal and the second signal,
wherein the second circuit is configured to set durations of the one or more variable time-delays based at least in part on the error signal.

9. An apparatus, comprising:
a memory array;
a first circuit coupled with the memory array and a conductive line configured to receive an input signal representative of data written to or read from the memory array and output a second signal, the first circuit configured to determine a voltage of a first signal at a sampling event based at least in part on the input signal and a feedback signal;
a second circuit coupled with an output of the first circuit and configured to apply a variable time-delay to the second signal and output a delayed signal, wherein:
the second circuit comprises a single delay element circuit configured to receive the second signal and output the delayed signal based at least in part on applying the variable time-delay to the second signal, and
the second circuit is configured to set a delay parameter of the single delay element circuit based at least in part on one or more characteristics of the input signal that occur after the sampling event; and
a third circuit coupled with the second circuit and the first circuit, the third circuit configured to generate the feedback signal based at least in part on the delayed signal output by the second circuit.

10. An apparatus, comprising:
a memory array;
a first circuit coupled with the memory array and a conductive line configured to receive an input signal representative of data written to or read from the memory array and output a second signal, the first circuit configured to determine a voltage of a first signal at a sampling event based at least in part on the input signal and a feedback signal;
a second circuit coupled with an output of the first circuit and configured to apply one or more variable time-delays to the second signal and output one or more delayed signals, wherein the second circuit comprises a plurality of delay element circuits configured to receive the second signal and output a plurality of delayed signals based at least in part on the second signal, wherein the second circuit is further configured to set delay parameters of the plurality of delay element circuits based at least in part on a plurality of characteristics of the input signal; and wherein:
the plurality of characteristics of the input signal occur with a respective plurality of durations after the sampling event,
a quantity of the plurality of delay element circuits is less than a quantity of the plurality of characteristics, and
the second circuit is configured to set the delay parameters of the plurality of delay element circuits to be equal to durations associated with characteristics of the plurality of characteristics having an effect on the input signal during subsequent sampling intervals that exceeds a threshold; and
a third circuit coupled with the second circuit and the first circuit, the third circuit configured to generate the feedback signal based at least in part on the one or more delayed signals output by the second circuit.

11. An apparatus comprising:
a memory array;
a first circuit coupled with the memory array and a conductive line configured to receive an input signal representative of data written to or read from the memory array and output a second signal, the first circuit configured to determine a voltage of a first signal at a sampling event based at least in part on the input signal and a feedback signal;
a second circuit coupled with an output of the first circuit and configured to apply one or more variable time-delays to the second signal and output one or more delayed signals;
a third circuit coupled with the second circuit and the first circuit, the third circuit configured to generate the feedback signal based at least in part on the one or more delayed signals output by the second circuit;
a fourth circuit coupled with the first circuit and configured to output an error signal for calibrating the second circuit based at least in part on the first signal and the second signal, wherein the second circuit is further configured to set durations of the one or more variable time-delays based at least in part on the error signal; and
a subtraction circuit coupled with the first circuit and the third circuit, the subtraction circuit configured to output the first signal to the first circuit based at least in part on subtracting the input signal and the feedback signal.

12. The apparatus of claim 11, wherein the fourth circuit comprises a second subtraction circuit that is configured to output the error signal based at least in part on subtracting the first signal and the second signal.

13. The apparatus of claim 11, wherein the fourth circuit comprises:
a second subtraction circuit that is configured to output a first error signal based at least in part on subtracting the first signal and the second signal;
a delay element circuit configured to delay the first error signal to obtain a delayed error signal; and
a third subtraction circuit configured to subtract the first error signal and the delayed error signal to obtain the error signal for calibrating the second circuit.

14. An apparatus, comprising:
a memory array;
a first circuit coupled with the memory array and a conductive line configured to receive an input signal representative of data written to or read from the memory array and output a second signal, the first circuit configured to determine a voltage of a first signal at a sampling event based at least in part on the input signal and a feedback signal;
a second circuit coupled with an output of the first circuit and configured to apply one or more variable time-delays to the second signal and output one or more delayed signals;
a third circuit coupled with the second circuit and the first circuit, the third circuit configured to generate the feedback signal based at least in part on the one or more delayed signals output by the second circuit; and
a fourth circuit coupled with the first circuit and configured to output an error signal for calibrating the second circuit based at least in part on the first signal and the second signal, wherein the second circuit is further configured to set durations of the one or more variable time-delays based at least in part on the error signal, wherein:
the fourth circuit is further configured to output a second error signal for calibrating the third circuit based at least in part on the input signal and the second signal and the second circuit being calibrated, and
the third circuit is configured to set one or more amplification factors for the one or more delayed signals based at least in part on the second error signal.

15. An apparatus, comprising:
a memory array;
a first circuit coupled with the memory array and a conductive line configured to receive an input signal representative of data written to or read from the memory array and output a second signal, the first circuit configured to determine a voltage of a first signal at a sampling event based at least in part on the input signal and a feedback signal;
a second circuit coupled with an output of the first circuit and configured to apply one or more variable time-delays to the second signal and output one or more delayed signals;
a third circuit coupled with the second circuit and the first circuit, the third circuit configured to generate the feedback signal based at least in part on the one or more delayed signals output by the second circuit; and
a fourth circuit that comprises the third circuit and is configured to modify a reference signal based at least in part on the feedback signal,
wherein the first circuit comprises a comparator that is configured to receive the input signal and the reference signal and generate the second signal based at least in part on the input signal and the reference signal, wherein the input signal is equivalent to the first signal.

16. A method, comprising:
setting a variable time-delay to a first duration;
receiving, after setting the variable time-delay to the first duration, an input signal over a conductive line, the input signal being representative of data written to or read from a memory array;
determining, at a sampling event, a voltage of a first signal based at least in part on a feedback signal and the input signal;
outputting a second signal having a voltage level that is based at least in part on determining the voltage of the first signal;
setting, after the input signal is received, the variable time-delay to a second duration;
applying the variable time-delay to the second signal to output a delayed signal; and
generating the feedback signal based at least in part on the delayed signal.

17. The method of claim 16, further comprising:
determining a duration of the variable time-delay based at least in part on magnitudes of one or more characteristics of the input signal and a timing of the one or more characteristics of the input signal after the sampling event.

18. The method of claim 16, further comprising:
modifying the input signal based at least in part on the feedback signal to obtain the first signal; and
determining the second duration of the variable time-delay based at least in part on a difference between the first signal and the second signal.

19. A method, comprising:
determining, at a sampling event, a voltage of a first signal based at least in part on a feedback signal and an input signal that is received over a conductive line and is representative of data written to or read from a memory array;
outputting a second signal having a voltage level that is based at least in part on determining the voltage of the first signal;
determining a duration of a variable time-delay based at least in part on magnitudes of one or more characteristics of the input signal and a timing of the one or more characteristics of the input signal after the sampling event;
determining an amplification factor based at least in part on the duration of the variable time-delay and a magnitude of a corresponding characteristic of the input signal;
applying the variable time-delay to the second signal to output a delayed signal; and
generating the feedback signal based at least in part on the delayed signal, wherein generating the feedback signal comprises amplifying the delayed signal by the amplification factor.

20. A method, comprising:
determining, at a sampling event, a voltage of a first signal based at least in part on a feedback signal and an input signal that is received over a conductive line and is representative of data written to or read from a memory array;

outputting a second signal having a voltage level that is based at least in part on determining the voltage of the first signal;

applying a variable time-delay to the second signal to output a delayed signal;

generating the feedback signal based at least in part on the delayed signal;

modifying the input signal based at least in part on the feedback signal to obtain the first signal;

determining a duration of the variable time-delay based at least in part on a difference between the first signal and the second signal;

outputting an error signal based at least in part on the difference between the first signal and the second signal;

delaying the error signal to obtain a delayed error signal; and determining a difference between the error signal and the delayed error signal, wherein the duration of the variable time-delay is based at least in part on the difference between the error signal and the delayed error signal.

21. A method, comprising:

determining, at a sampling event, a voltage of a first signal based at least in part on a feedback signal and an input signal that is received over a conductive line and is representative of data written to or read from a memory array;

outputting a second signal having a voltage level that is based at least in part on determining the voltage of the first signal;

applying a variable time-delay to the second signal to output a delayed signal;

generating the feedback signal based at least in part on the delayed signal;

adjusting a reference signal based at least in part on the feedback signal; and comparing the first signal and the reference signal, wherein the first signal is equivalent to the input signal and the voltage level of the second signal is based at least in part on the comparing.

22. An apparatus, comprising:

a memory array; and a controller coupled with the memory array, the controller operable to cause the apparatus to:

set a variable time-delay to a first duration;

receive, after setting the variable time-delay to the first duration, an input signal over a conductive line, the input signal being representative of data written to or read from the memory array;

determine, at a sampling event, a voltage of a first signal based at least in part on a feedback signal and the input signal;

output a second signal having a voltage level that is based at least in part on determining the voltage of the first signal;

set, after the input signal is received, the variable time-delay to a second duration;

apply the variable time-delay to the second signal to output a delayed signal; and generate the feedback signal based at least in part on the delayed signal.

* * * * *